United States Patent
Haseltine et al.

(10) Patent No.: US 9,838,867 B2
(45) Date of Patent: Dec. 5, 2017

(54) STORYTELLING ENVIRONMENT: INTRADEVICE COMMUNICATIONS

(71) Applicant: Disney Enterprises, Inc., Burbank, CA (US)

(72) Inventors: Eric C. Haseltine, Silver Spring, MD (US); Katherine M. Bassett, Burbank, CA (US); Michael P. Goslin, Sherman Oaks, CA (US); James E. Smith, Burbank, CA (US); Stephen A. Thornton, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 374 days.

(21) Appl. No.: 14/525,303

(22) Filed: Oct. 28, 2014

(65) Prior Publication Data

US 2015/0117647 A1    Apr. 30, 2015

Related U.S. Application Data

(60) Provisional application No. 61/896,512, filed on Oct. 28, 2013.

(51) Int. Cl.
| | |
|---|---|
| *H04L 9/08* | (2006.01) |
| *H04W 12/04* | (2009.01) |
| *H04L 9/32* | (2006.01) |
| *H04L 29/06* | (2006.01) |
| *H04W 12/02* | (2009.01) |

(52) U.S. Cl.
CPC ............ *H04W 12/04* (2013.01); *H04L 9/0827* (2013.01); *H04L 9/326* (2013.01); *H04L 63/18* (2013.01); *H04L 2209/80* (2013.01); *H04W 12/02* (2013.01)

(58) Field of Classification Search
None
See application file for complete search history.

(56) References Cited

U.S. PATENT DOCUMENTS

| | | | |
|---|---|---|---|
| 2007/0066323 A1* | 3/2007 | Park .......................... | G01S 5/02 455/456.2 |
| 2013/0022202 A1* | 1/2013 | Stroud ................... | H04W 12/02 380/270 |

(Continued)

*Primary Examiner* — Amir Mehrmanesh
(74) *Attorney, Agent, or Firm* — Patterson + Sheridan, LLP

(57) ABSTRACT

One embodiment provides a device that includes one or more line of sight transmitters configured to transmit signals over a line of sight communications medium, one or more transmitters configured to transmit signals over another communications medium and a controller. The controller is configured to perform an operation that includes retrieving a key adapted for use in decrypting encrypted content. The operation further includes transmitting the key to a second device over the line of sight communications medium using the one or more line of sight transmitters. Additionally, the operation includes encrypting data such that the data can be decrypted using the retrieved key. The operation also includes transmitting the encrypted data to the second device over the other communications medium using the one or more transmitters, where the second device is configured to decrypt the encrypted data using the key received over the line of sight communications medium.

5 Claims, 8 Drawing Sheets

(56) References Cited

U.S. PATENT DOCUMENTS

2014/0039277 A1* 2/2014 Abraham ............. A61B 8/0841
600/301
2017/0064547 A1* 3/2017 Klaue ................... H04L 9/0838

* cited by examiner

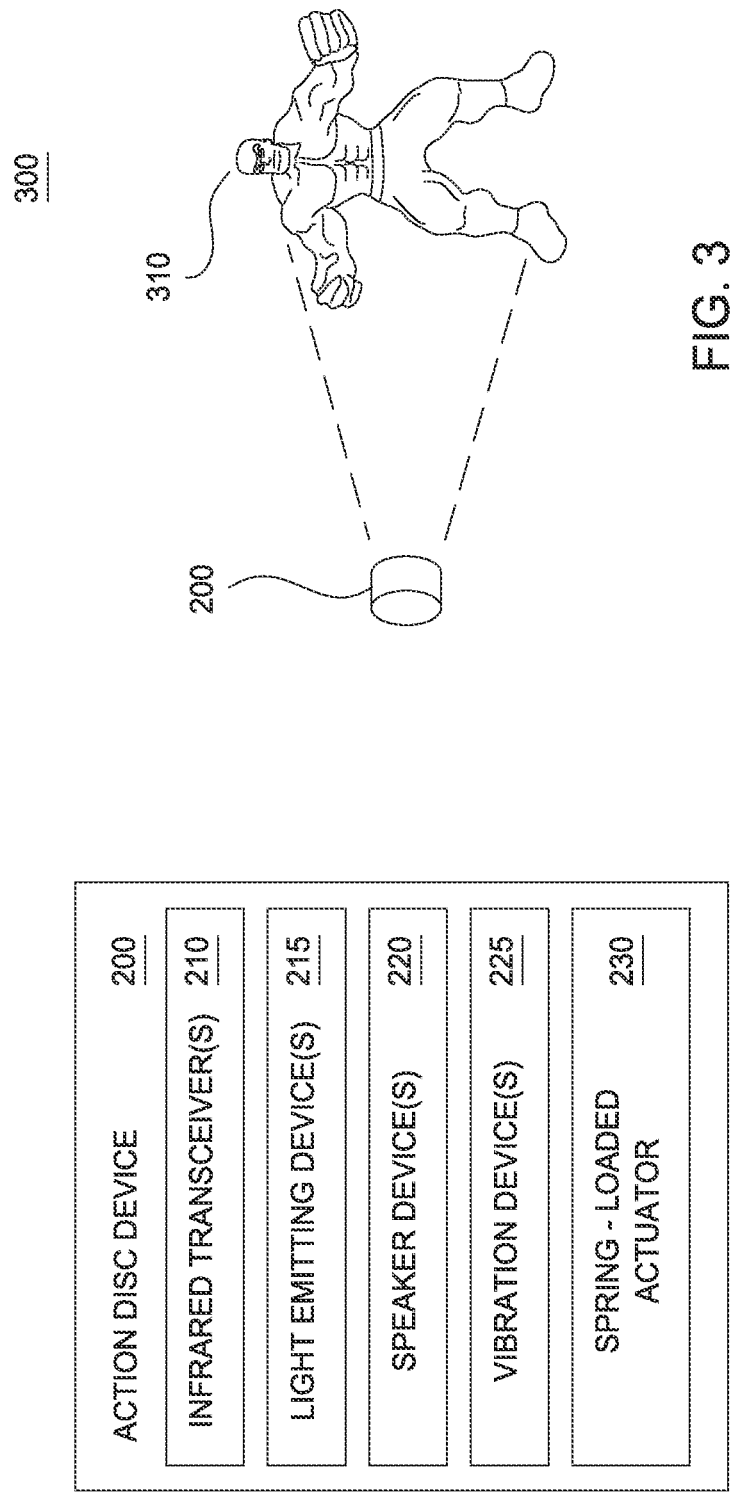

STORYTELLING ENVIRONMENT: INTRADEVICE COMMUNICATIONS

CROSS-REFERENCE TO RELATED APPLICATIONS

This application claims benefit of U.S. provisional patent application Ser. No. 61/896,512, filed Oct. 28, 2013, which is herein incorporated by reference in its entirety.

BACKGROUND

Field of the Invention

The present invention generally relates to home entertainment, and more specifically to techniques for providing an immersive playtime environment using interactive devices.

Description of the Related Art

Computer graphics technology has come a long way since video games were first developed. Relatively inexpensive 3D graphics engines now provide nearly photo-realistic interactive game play on hand-held video game, home video game and personal computer hardware platforms costing only a few hundred dollars. These video game systems typically include a hand-held controller, game controller, or, in the case of a hand-held video game platform, an integrated controller. A user interacts with the controller to send commands or other instructions to the video game system to control a video game or other simulation. For example, the controller may include a joystick and buttons operated by the user.

While video games allow the user to interact directly with the video game system, such interactions primarily influence the graphical depiction shown on the video game device (or on a connected display), and rarely influence any other objects outside of the virtual world. That is, a user may specify an input to the video game system, indicating that the user's avatar should perform a jump action, and in response the video game system could display the user's avatar jumping. However, such interactions are typically limited to the virtual world, and any interactions outside the virtual world are limited (e.g., a hand-held gaming device could vibrate when certain actions occur).

Additionally, many hand-held gaming devices include some form of camera device which may be used to capture an image or a series of images of a physical, real-world scene. The captured images can then be displayed, for instance, on a display of the hand-held gaming device. Certain devices may be configured to insert virtual objects into the captured images before the images are displayed. Additionally, other devices or applications may enable users to draw or paint particular within a captured image of a physical scene. However, as such alterations apply only to a single image of the physical scene, subsequent captured images of the physical scene from different perspectives may not incorporate the user's alterations.

SUMMARY

One embodiment provides a device that includes one or more line of sight transmitters configured to transmit signals over a line of sight communications medium, one or more transmitters configured to transmit signals over another communications medium and a controller. The controller is configured to perform an operation that includes retrieving a key adapted for use in decrypting encrypted content. The operation further includes transmitting the key to a second device over the line of sight communications medium using the one or more line of sight transmitters. Additionally, the operation includes encrypting data such that the data can be decrypted using the retrieved key. The operation also includes transmitting the encrypted data to the second device over the other communications medium using the one or more transmitters, where the second device is configured to decrypt the encrypted data using the key received over the line of sight communications medium.

Another embodiment provides a device that includes one or more line of sight sensors configured to receive signals over a line of sight communications medium, one or more sensors configured to receive signals over a second communications medium that is distinct from the line of sight communications medium, and a controller configured to perform an operation. The operation includes receiving, from a second device, a key adapted for use in decrypting encrypted content, over the line of sight communications medium using the one or more line of sight sensors. Additionally, the operation includes receiving, from the second device, encrypted data over the second communications medium using the one or more sensors. The operation also includes decrypting the encrypted data using the key received over the line of sight communications medium.

Yet another embodiment includes a system that includes a first device and a second device. The first device includes one or more line of sight transmitters configured to transmit signals over a line of sight communications medium, one or more transmitters configured to transmit signals over a second communications medium that is distinct from the line of sight communications medium, and a controller configured to perform a first operation. The first operation includes transmitting a key over the line of sight communications medium using the one or more line of sight transmitters and transmitting encrypted data device over the second communications medium using the one or more transmitters. The second device includes one or more line of sight sensors configured to receive signals over a line of sight communications medium, one or more sensors configured to receive signals over a second communications medium that is distinct from the line of sight communications medium, and a second controller configured to perform a second operation. The second operation includes receiving the key over the line of sight communications medium using the one or more line of sight sensors. The second operation further includes receiving the encrypted data over the second communications medium using the one or more sensors and decrypting the encrypted data using the key received over the line of sight communications medium.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 2 is a block diagram illustrating an action disc device, according to one embodiment described herein.

FIG. 3 illustrates an interaction between an action disc device and a wind-up action figure device, according to one embodiment described herein.

DETAILED DESCRIPTION

One embodiment described herein generally provides a technique for creating sensory immersion in an interactive playtime environment by performing audiovisual effects using a plurality of interactive devices. For example, a controller device could detect a user has performed a particular action (e.g., performing a gesture to use the "Force" in a Star Wars® themed playtime environment) and, in response, could cause a plurality of devices within the room to perform audiovisual effects, creating a feeling of sensory immersion for the user and providing an enhanced sense of realism for the user. The individual devices can be limited in terms of their audio and visual output capabilities (e.g., capable of outputting sound using a single speaker operating at a particular range of frequencies, capable of outputting light in a limited number of colors, etc.). However, the aggregate effect from multiple devices outputting audiovisual effects in unison can provide a sensorial effect that is greater than that provided by any of the devices individually.

Moreover, by working in unison, the devices can compensate for each others' weaknesses, thereby producing a greater sensory experience for the user. For example, a particular device may be equipped with a speaker capable of outputting higher frequency sounds and incapable of producing low-frequency sounds (e.g., a tweeter), while another device may include a speaker device capable of producing only lower-frequency sounds (e.g., a sub-woofer). In this example, while neither device may produce an immersive sensory experience individually, the devices can provide a greater sensorial effect when working in unison.

Figure 1:
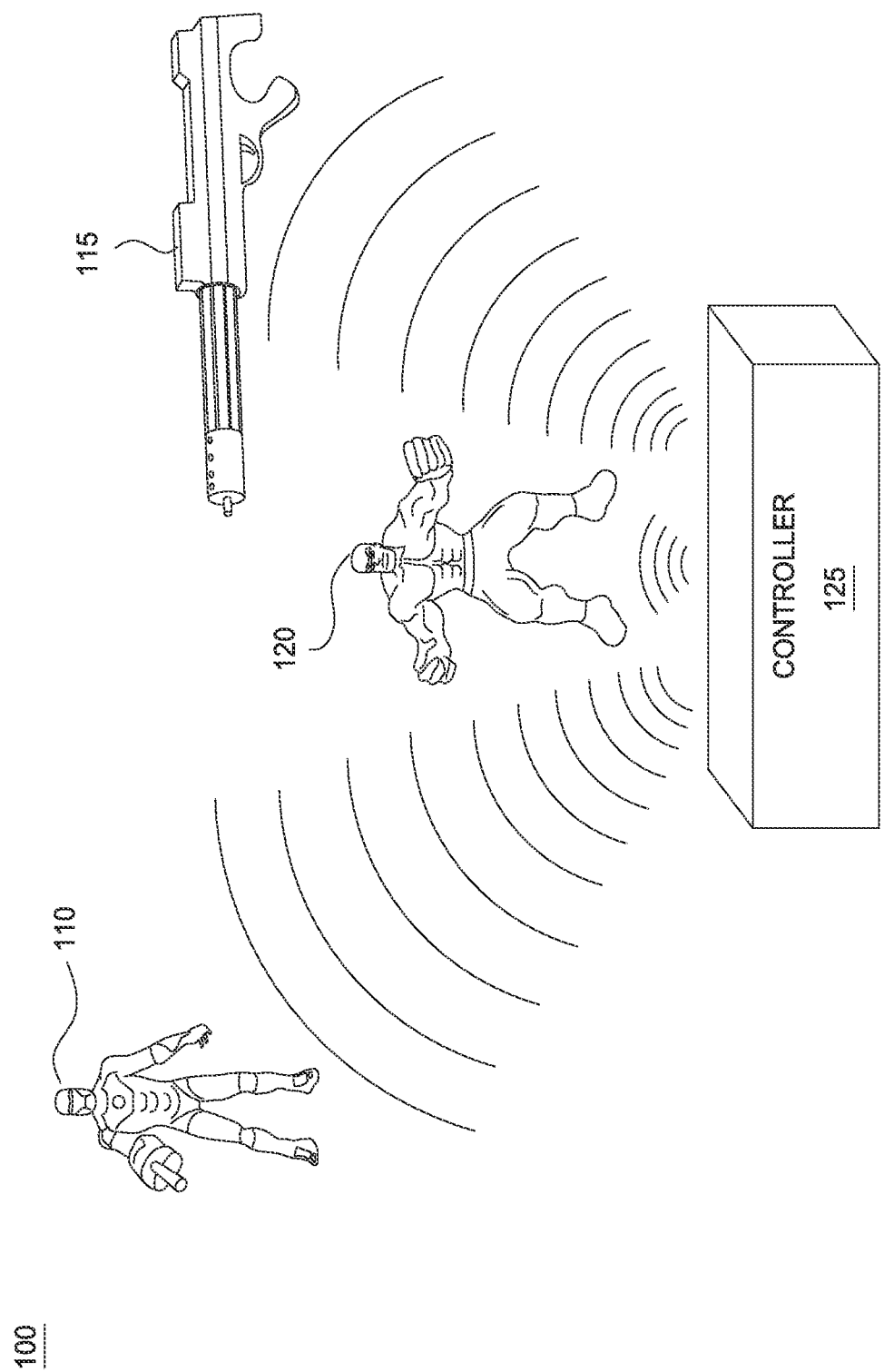
FIG. 1 illustrates a playtime environment in which a controller is instructing interactive devices to perform an effect, according to one embodiment described herein.

An example will now be discussed with respect to FIG. 1, which illustrates a playtime environment in which a controller is instructing interactive devices to perform an effect, according to one embodiment described herein. As shown, the system 100 includes an Iron Man® action FIG. 110, a Star Wars® blaster rifle 115, a Hulk® action FIG. 120, and a controller device 125. Here, the toys 110, 115 and 120 are generally capable of producing audiovisual effects (e.g., audio output, light effects, movement effects such as vibration, etc.). In one embodiment, the toys 110, 115 and 120 may be configured with an action disc device (e.g., device 200 shown in FIG. 2 and discussed in more detail below). Of note, while various examples are discussed herein with respect to the toy devices 110, 115 and 120, it is broadly contemplated that these techniques can be utilized with any number of devices and any types of devices, consistent with the functionality described herein.

However, while the toys 110, 115 and 120 are capable of producing audiovisual effects, the toys 110, 115 and 120 may not be configured with logic to determine when conditions in the physical environment indicate a particular effect should be performed. This may be due to, in part, the cost and complexity of configuring each toy 110, 115 and 120 with the logic and hardware resources to detect stimuli in the physical environment and to perform a contextually appropriate audiovisual effect in response synchronously with other devices. As such, the toys 110, 115 and 120 could be configured to receive commands (e.g., from controller 125) and to perform an audiovisual effect(s) responsive to the received commands. Doing so allows the toys 110, 115 and 120 to be produced much more economically, while maintaining the capability to perform audiovisual effect(s) as part of a storytelling or playtime experience.

For example, as part of a Star Wars® storytelling experience, the storyline could indicate that devices within the physical environment should play a particular sound effect when the user performs a predefined gesture to use the "force." As such, the controller 125 could monitor the user's behavior to detect when the user has performed the predefined gesture. For example, the controller 125 could use one or more camera devices (e.g., within the controller devices 125, within one or more of the toys 110, 115 and 120, etc.) to monitor the user's movement within the physical environment. As another example, the user could wear an article (e.g., a bracelet) configured with an accelerometer device and capable of reporting data describing the user's movement to the controller device 125.

Upon detecting the user has performed the predefined gesture, the controller 125 could broadcast a command to the toy devices 110, 115 and 120, instructing the toy devices 110, 115 and 120 to synchronously perform an audiovisual effect. Such a command could be broadcast, for example, via a radio-frequency transmitter, an infrared emitter, an ultrasound transmitter, and so on. More generally, any communications protocol may be used for the communication between the controller and the toy devices 110, 115 and 120, consistent with the functionality described herein.

The toy devices 110, 115 and 120 could then receive the command and could perform the specified audiovisual effect in synchrony. For example, in the event the command specifies to play a particular sound effect, each of the toy devices 110, 115 and 120 could output the particular sound effect in synchrony with the other toy devices, thereby creating an improved sensorial experience for the user, relative to any of the toy devices 110, 115 and 120 playing the sound effect individually. Here, the sound effect could be, e.g., a sampled sound effect or a function-generated sound effect. Moreover, as discussed above, by playing the sound effect synchronously with one another, the toy devices 110, 115 and 120 can compensate for each other's weaknesses (e.g., a particular toy device being capable of outputting sounds within a limited frequency range), thereby producing an improved sound effect and sensorial immersion for the user.

While any number of toy devices can be used, the sense of immersion experienced by the user generally scales with the number of devices performing audiovisual effects in synchrony. For example, the controller 125 could detect when the user pulls the trigger to fire the blaster gun 115, and in response, could broadcast a command to all of the toy devices 110, 115 and 120 to output the sound effect of the blast being fired. Additionally, the controller 125 could instruct the toy devices 110, 115 and 120 to perform additional audiovisual effects, such as flashing lights and movements, in response to the user firing the blaster. Doing so helps to overload the user's senses, thereby creating a more immersive and realistic playtime experience.

Generally, a variety of techniques may be used to configure the toy devices 110, 115 and 120 to synchronously output the audiovisual effect. In one embodiment, the toy devices 110, 115 and 120 could be configured to output the audiovisual effect immediately upon receiving the command from the controller 125. Such an embodiment may be preferable when the toy devices 110, 115 and 120 receive the command at substantially the same time and when the toy devices 110, 115 and 120 take substantially the same amount of time to process the command and to perform the corresponding audiovisual effect. As another example, each of the toy devices 110, 115 and 120 (as well as the controller 125) could maintain an internal clock whose time is synchronized to the internal clock of the other toy devices, and the command transmitted by the controller 125 could specify a time at which to perform the audiovisual effect. Generally, any technique suitable for use in synchronizing the internal clocks may be used, consistent with the present disclosure. Examples of such techniques include, without limitation, Network Time Protocol (NTP), Precision Time Protocol (PTP), Reference Broadcast Time Synchronization, and so on.

In one embodiment, a package containing one or more of the toy devices 110, 115 and 120 (e.g., within a retail sales environment) can be adapted to produce audiovisual effects as well. For example, an action disc (e.g., the action disc device 200) including a vibro-accoustic exciter could be attached to the package, and could utilize a physical cavity within the package to produce low-frequency bass sounds, in essence acting as a woofer or a subwoofer. Doing so allows the package to be reused as part of the play experience (i.e., rather than being discarded, as with conventional packaging), while also producing sounds at lower frequencies than can easily be produced on the toy devices 110, 115 and 120. Additionally, the low-frequency sounds produced by the package could be used for other purposes as part of the playtime experience, such as vibrating items placed on top of the package.

In addition to synchronously performing audiovisual effects, the controller 125 may instruct the toy devices 110, 115 and 120 to each perform different effects in unison or according to a determined schedule. For instance, the controller 125 could create the illusion of a moving sound by scheduling each of the toy devices 110, 115 and 120 to play a sound effect according to a determined schedule or to play sound effects in unison that give the appearance of a moving sound. As an example, the controller 125 broadcast commands to create a panning effect in which the amplitude, spectral content (e.g., Doppler effects), and phase of sounds emerging from differing toy devices 110, 115 and 120 are adjusted to localize sounds in a dynamic trajectory among the different toys. Here, the controller 125 could move the localized sounds through the physical environment to simulate the user shooting the blaster rifle 115 and the blaster beam moving from one toy device to the next until ultimately reaching its target. Doing so provides a more realistic experience for the user, particularly compared to only the blaster device 115 outputting a sound effect indicating the blaster has been fired.

As discussed above, in addition to synchronously playing sound effects, the toy devices 110, 115 and 120 may be configured to reinforce these acoustical effects with other audiovisual effects such as simultaneous light effects and physical motions. For example, the controller 125 could broadcast a command(s) instructing the toy devices 110, 115 and 120 to perform respective movements (e.g., activating a light-emitting device within the respective toy device) according to a determined schedule, in order to produce a phi phenomenon optical illusion in which the user perceives continuous motion between the toy devices. Such an effect could be coupled with the movement of the sound effect produced through dynamic variations in the phase, intensity and spectral content of the sounds played by the different toy devices 110, 115 and 120. In addition to the sound and movement emanating from a source to a destination, the controller 125 could broadcast commands creating the illusion of an object (e.g., a virtual blast fired from the toy blaster device 115) hitting the target and then ricocheting off of the target in a determined direction. Doing so produces a much more powerful illusion of the user actually firing the blaster device 115, thereby improving the playtime experience.

While the toy devices 110, 115 and 120 may include hardware resources to perform the audiovisual effects discussed above, other embodiments may include toy devices that possess limited or no interactive capabilities. Such embodiments may be preferable, for example, when seeking to minimize the expense of manufacturing the toy devices. In such an embodiment, the interactivity of the toy devices may be achieved by configuring each of the inert toy devices with an action disc device. An example of such a device is shown in FIG. 2, which depicts an action disc device 200 that includes an infrared transceiver(s) 210, a light-emitting device(s) 215, a speaker device(s) 220, a vibration device(s) 225 and a spring-loaded actuator 230. Generally, the action disc device 200 provides a modular way to incorporate interactivity into a compatible device (e.g., a toy action figure) within a networked ecosystem of devices. For instance, the action disc device 200 could be configured to receive broadcasted commands from the controller device 125 and to perform an audiovisual action in response (e.g., using one or more of the light-emitting devices 215, speaker devices 220, vibration devices 225 and spring-loaded actuator 230).

Advantageously, using a modular device such as the action disc device 200 allows simple, inexpensive toys to be configured to express complex behaviors and to interactively respond to their physical environment, thereby saving money relative to producing more complex toy devices including increased memory, radio-frequency (RF) circuits, and processing capabilities. Additionally, through the use of the spring-loaded actuator 230, the action disc device 200 can help to conserve the cost and drain of the battery (as well as the required size of the battery) by using mechanically stored energy to produce audiovisual effects. For instance, the spring-loaded actuator 230 could be triggered using a cam motion of a low-cost toy motor whose movement causes an object placed on the actuator (e.g., a toy device) to move or fall over. Moreover, the modular nature of the action disc device 200 allows a user to reuse the capabilities of the action disc device 200 by moving the device 200 between toy devices, thus providing additional cost savings relative to incorporating the device's 200 functionality into each and every toy device owned by the user.

For example, the controller 125 could broadcast infrared signals to the action disc device 200 in order to trigger discrete audiovisual effects (e.g., discrete expressions of movement, sound, light etc.). Additionally, the action disc device 200 allows more sophisticated toy devices to control the action disc, in order to render a complex sequence of behaviors via a stream of infrared commands. In one embodiment, the controller 125 employs an infrared protocol that uses a high brightness (e.g., around 100 mW at 940 nm) infrared light-emitting diodes (LEDs) to propagate carrier modulated signals (e.g., at 38 kHz) to TSOP infrared receivers in target devices (e.g., another action disc device 200). Such a protocol can allow unicast, broadcast and multicast modes for controlling individual toys (or action discs) or multiple toys (or action discs) in sequence or synchrony. Doing so allows the action discs and their corresponding toy device (i.e., the device to which the action disc is attached) to appear to behave intelligently (e.g., in response to physical stimuli, in response to a context of a story, etc.), even though the action discs can be low cost devices and the logic providing the intelligence can reside elsewhere (e.g., controller 125).

For instance, in one embodiment, more sophisticated toys or the controller device 125 can direct the actions of the action discs via transmitted infrared signals, in order to control the emission of sound, light, and motion from the action disc device 200. Additionally, such infrared signals can trigger scripts or macros stored within program memory or firmware within the action disc device 200, causing the device 200 to perform a sequence of audiovisual effects. Moreover, such infrared signals can even be used to communicate in the absence of line-of-sight between the more sophisticated toy (or controller 125) and the action disc 200, through the use of high power output and sensitive infrared receivers.

In one embodiment, the action disc device 200 is configured to connect with a wind-up toy via a mechanical linkage, in order to control the behavior of the wind-up toy. An example of such an embodiment is shown in FIG. 3, which illustrates an interaction between an action disc device and a wind-up action figure device, according to one embodiment described herein. As shown, the diagram 300 illustrates an action-disc device 200 being attached to a Hulk® wind-up toy action figure device 310. Generally, the wind-up toy 310 includes a spring-loaded actuator (or more generally, any device under tension and capable of being released) and a mechanism for releasing the spring-loaded actuator.

For example, the wind-up toy 310 could include a spring-loaded actuator in each foot that, when released, causes the wind-up toy 310 to fall over from the standing position. In such an example, the action disc device 200 could be capable of triggering the release mechanism on the Hulk® wind-up toy 310, and in response to receiving a particular command (e.g., from controller 125), the action disc device 200 could trigger the release mechanism, causing the toy 310 to fall over. For instance, the controller 125 could maintain a count of how many times the user has successfully struck the wind-up toy 310 with blasts from the toy blaster rifle 115. Upon determining that the user has struck the toy a threshold amount of times with blasts from the rifle 115, the controller 125 could transmit an infrared signal to the action disc device 200 coupled to the toy 310, instructing the action disc device 200 to trigger the release mechanism, thereby causing the toy 310 to fall over. Advantageously, doing so enables low cost toys such as the wind-up toy 310 to operate in conjunction with the controller device 125 and more sophisticated toy devices, and reduces battery consumption relative to moving the toy device 310 through electrical means (e.g., vibration from an electric motor within the action disc device 200).

Figure 4:
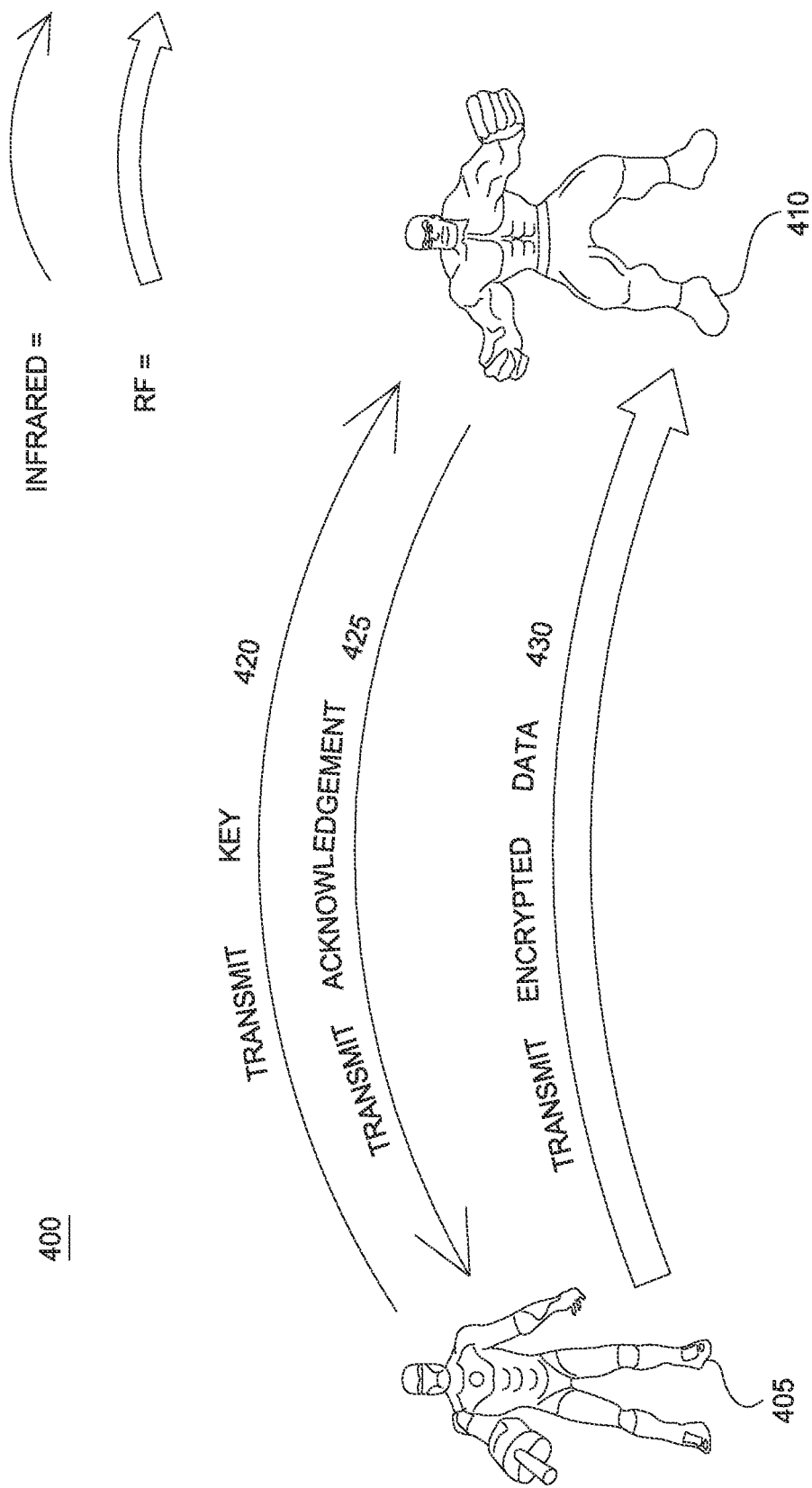
FIG. 4 illustrates a communication sequence between two interactive devices, according to one embodiment described herein.

Although there are numerous advantages to allowing toy devices and action discs to be controlled remotely, such remote control introduces some additional challenges as well. For instance, additional security measures may be needed to prevent a malicious third party from remotely controlling one of the toy devices or action discs. As such, embodiments provide a dual-band security protocol for preventing unauthorized parties from controlling the toy devices and action discs. One example of such a security protocol is shown in FIG. 4, which illustrates a communication sequence between two interactive devices, according to one embodiment described herein. As shown, the diagram 400 depicts an environment that includes an Iron Man® toy device 405 and a Hulk® toy device 410. Here, the devices could be more sophisticated toy devices that include their own control logic, transmission logic, transceiver devices, etc., or could be unsophisticated toys (e.g., wind-up toys) configured with an action disc device 200.

In any event, the communication sequence begins with the Iron Man® action FIG. 405 transmitting a key to the Hulk® action FIG. 410 via an infrared signal (arrow 420). Of note, although the present example involves infrared signals and radio-frequency communication, more generally any two types of signals may be used to implement the described security protocol. Preferably, however, the signal used to transmit the key (as shown by arrow 420) is of a type that does not easily pass through walls and other solid surfaces, to ensure that malicious third parties outside of the physical environment (e.g., a child's room) cannot access the transmitted key.

As used herein, a key refers to data (e.g., a sequence of numbers) that can be used to decrypt encrypted data (e.g., using asymmetric cryptography techniques, symmetric cryptography technique, etc.) or to authenticate the identity of a remote party (e.g., a digital certificate). Generally speaking, a number of different cryptography techniques exist that can be used with the security protocols described herein. Examples of such techniques include, without limitation, Advanced Encryption Standard (AES) encryption, Data Encryption Standard (DES) encryption, Elliptic Curve Cryptography (ECC), Rivest-Shamir-Adleman (RSA) encryption, the Cramer-Shoup system, the Diffie-Hellman key exchange protocol, and so on. However, the present disclosure is not limited to any particular cryptographic technique, and more generally any known (or unknown) technique for encrypting and decrypting data and/or authenticating the identity of a remote party can be used, consistent with the functionality described herein.

Upon receiving the infrared signal specifying the key, the Hulk® action figure stores the key for later use and transmits an acknowledgement message back to the Iron Man® action FIG. 425 via another infrared signal (arrow 425). Here, receipt of the acknowledgement messages by the Iron Man® action FIG. 405 indicates that the Hulk® action FIG. 410 successfully received the transmitted key. At some later point in time, the Iron Man® action FIG. 405 transmits encrypted data to the action FIG. 410 using a RF signal (arrow 430). The Hulk® action FIG. 410 could then decrypt the encrypted data using the previously received key.

For example, the encrypted data could specify one or more commands specifying audiovisual actions for the Hulk® action FIG. 410 to perform, and upon decrypting the commands, the action FIG. 410 could perform the specified audiovisual commands. Advantageously, by transmitting the key using a first type of signal (i.e., infrared in the example shown in FIG. 4) and transmitting the encrypted data using a second type of signal (i.e., RF in the depicted example), embodiments can prevent malicious third parties from controlling the toy devices and action discs by transmitting commands to the interactive devices. That is, a third party attempting to broadcast an RF signal specifying a command to the Hulk® action FIG. 410 would be unable to do so successfully, as the third party would not have access to the security information needed to encrypt the command to be decoded by the key transmitted in arrow 420.

Figure 5:
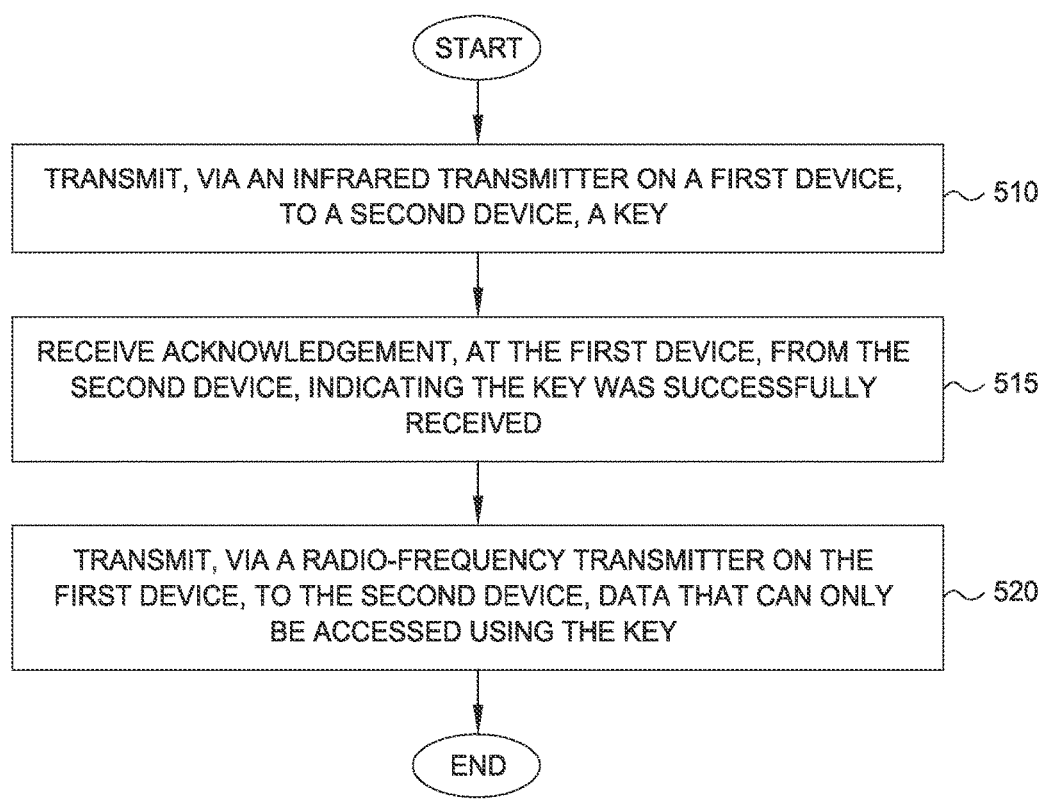
FIG. 5 is a flow diagram illustrating a method for transmitting encoded data between devices, according to one embodiment described herein.

FIG. 5 is a flow diagram illustrating a method for transmitting encoded data between devices, according to one embodiment described herein. As shown, the method 500 begins at block 510, where a first device transmits a key, via an infrared transmitter, to a second device. Generally, the first device represents any device capable of transmitting infrared and RF signals, and examples of the first device include without limitation interactive toy devices and action disc devices. Additionally, as discussed above, although the examples described in FIGS. 5 and 6 relate to a dual-band security protocol involving infrared and RF signals, more generally any two types of signals can be used, consistent with the functionality described herein.

The first device then receives an acknowledgement from the second device, indicating that the key was successfully received (block 515). For example, the acknowledgement message could be encoded as an infrared signal transmitted by the second device. At a subsequent moment in time, the first device transmits encrypted data to the second device using a radio-frequency transmitter (block 520), and the method 500 ends. Here, the encrypted data represents data that can only be accessed using the transmitted key.

Figure 6:
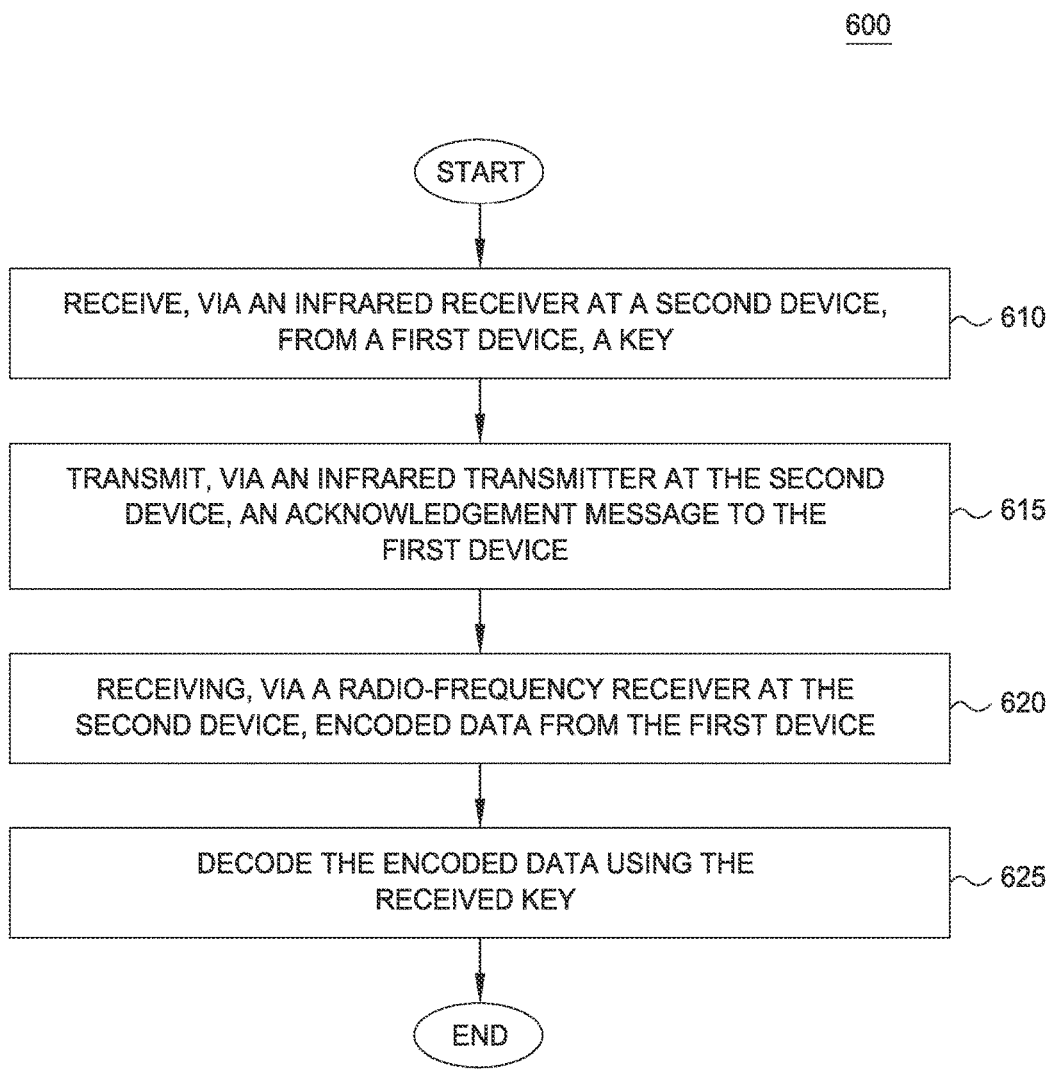
FIG. 6 is a flow diagram illustrating a method for receiving encoded data, according to one embodiment described herein.

FIG. 6 is a flow diagram illustrating a method for receiving encoded data, according to one embodiment described herein. As shown, the method 600 begins at block 610, where a second device receives a key from a first device using an infrared receiver. For example, the received key could be the key transmitted at block 510 in FIG. 5. Upon receiving the key, the second device transmits an acknowledgement message to the first device using an infrared transmitter (block 615). Generally, the acknowledgement message indicates to the first device that the second device successfully received the key. If, for instance, the first device does not receive the acknowledgement message within a defined window of time, the first device could retransmit the key to the second device using an infrared signal.

At some later point in time, the second device receives encoded data from the first device (block 620). Here, the encoded data is not transmitted via an infrared signal (as with the key), but rather is transmitted using a radio-frequency signal and is received at the second device via a radio-frequency receiver. Upon receiving the encrypted data, the second device decrypts the encrypted data using the received key (block 625), and the method 600 ends. The second device could then proceed to process the decrypted data, e.g., by executing one or more commands defined by the decrypted data that specify audiovisual effects for the second device to perform. By transmitting the key using an infrared signal and the encrypted data using an RF signal, embodiments can insure that remote threats (e.g., malicious third parties) cannot intercept or control signals among the networked distributed toys. For example, doing so can prevent an RF eavesdropper from detecting and spoofing RF signals from outside the user's home. Moreover, as the toys (or action discs) may be configured for RF and infrared communications, embodiments can enhance the security of the network of devices without adding any additional cost to the system.

Technical Description

Figure 7:
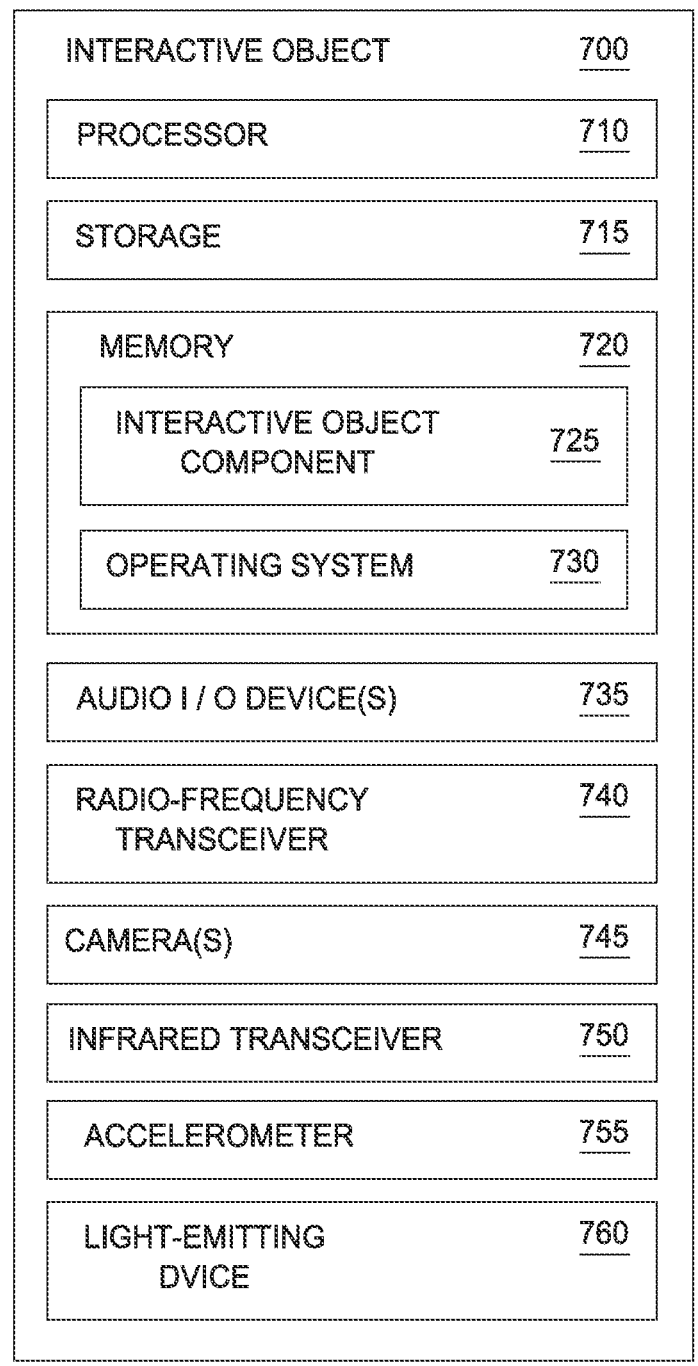
FIG. 7 is a block diagram illustrating an interactive object, according to one embodiment described herein.

An example of an interactive device is shown in FIG. 7, which is a block diagram illustrating an interactive device configured with an interactive object component, according to one embodiment described herein. In this example, the device 700 includes, without limitation, a processor 710, storage 715, memory 720, audio input/output (I/O) device(s) 735, a radio-frequency (RF) transceiver 740, a camera device(s) 745, an infrared transceiver 750, an accelerometer device 755, and a light-emitting device 760. Generally, the processor 710 retrieves and executes programming instructions stored in the memory 720. Processor 710 is included to be representative of a single CPU, multiple CPUs, a single CPU having multiple processing cores, GPUs having multiple execution paths, and the like. The memory 720 is generally included to be representative of a random access memory. The radio-frequency transceiver 740 enables the interactive object component 725 to connect to a data communications network (e.g., wired Ethernet connection or an 802.11 wireless network).

Further, while the depicted embodiment illustrates the components of a particular interactive device, one of ordinary skill in the art will recognize that interactive devices may use a variety of different hardware architectures. For instance, in one embodiment the controller component logic is implemented as hardware logic. Examples of such hardware logic include, without limitation, an application-specific integrated circuit (ASIC) and a field-programmable gate array (FPGA). Moreover, it is explicitly contemplated that embodiments may be implemented using any device or computer system capable of performing the functions described herein.

Returning to the embodiment depicted in FIG. 7, the memory 720 represents any memory sufficiently large to hold the necessary programs and data structures. Memory 720 could be one or a combination of memory devices, including Random Access Memory, nonvolatile or backup memory (e.g., programmable or Flash memories, read-only memories, etc.). In addition, memory 720 and storage 715 may be considered to include memory physically located elsewhere; for example, on another computer communicatively coupled to the interactive device 700. Illustratively, the memory 720 includes an interactive object component 725 and an operating system 730. The interactive object component 725 could be configured to receive commands (e.g., encoded in RF or infrared signals) and to execute the commands to perform audiovisual effects. In one embodiment, the interactive object component 725 is configured to decrypt the commands using a received key before executing the commands. The operating system 730 generally controls the execution of application programs on the interactive device 700. Examples of operating system 730 include UNIX, a version of the Microsoft Windows® operating system, and distributions of the Linux® operating system. Additional examples of operating system 730 include custom operating systems for gaming consoles, including the custom operating systems for systems such as the Nintendo DS® and Sony PSP®.

The infrared transceiver 750 represents any device capable of sending and receiving infrared signals. In another embodiment, a device 700 that only sends or receives infrared signals may be configured with an infrared transmitter or a infrared receiver, respectively, as opposed to the infrared transceiver 750. The sound I/O devices 735 could include devices such as microphones and speakers. For example, the speakers could be used to produce sound effects (e.g., explosion sound effects, dialogue, etc.) and/or to produce vibration effects.

Generally, the interactive object component 725 provides logic for the interactive device 700. For example, the interactive object component 725 could be configured to detect that a coded infrared signal has been received (e.g., using the infrared transceiver 750). The interactive object component 725 could then determine a type of the infrared signal (e.g., based on data specified within the coded infrared signal) and could determine a corresponding response based on determined type. For example, the interactive object component 725 could determine that the infrared signal specifies that a repulsor ray blast sound effect should be played, and, in response, could output the specified sound effect using audio I/O devices 735. As another example, the signal could be encoded with data specifying that a particular lighting effect should be displayed according to a specified schedule (e.g., at a particular point in time), and the interactive object component 725 could monitor the schedule (e.g., using an internal clock) and could activate the appropriate light-emitting device 760 at the appropriate time.

Figure 8:
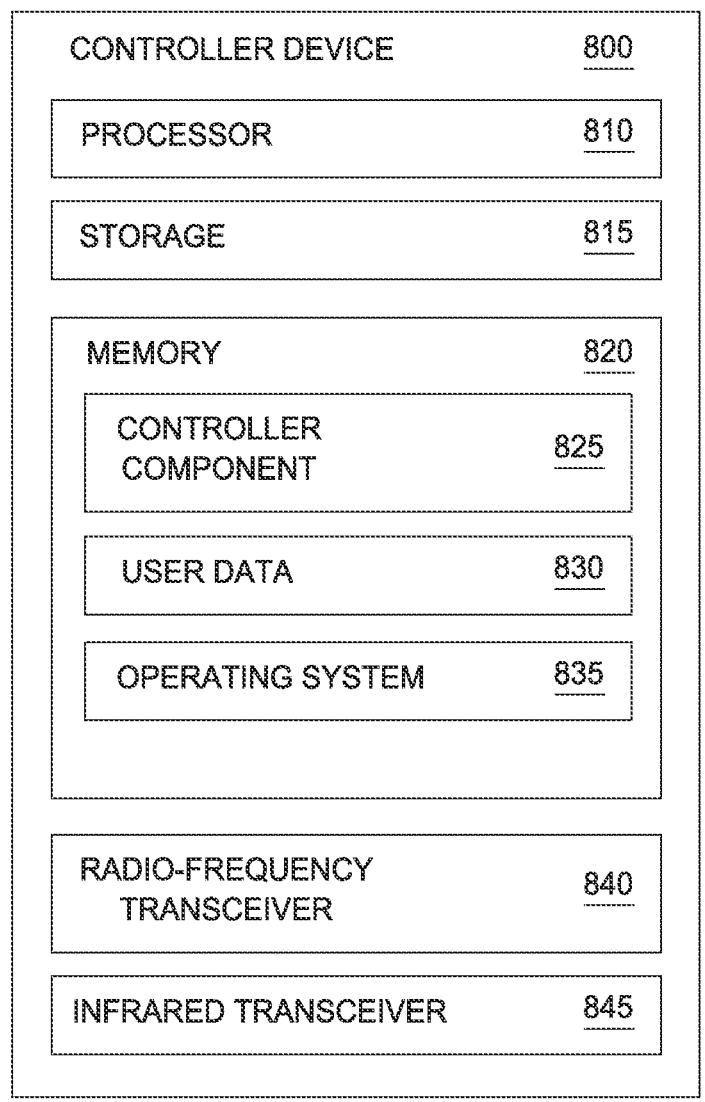
FIG. 8 is a block diagram illustrating a controller device, according to one embodiment described herein.

FIG. 8 illustrates an example of a controller device, according to one embodiment described herein. As shown, the controller 800 includes a processor 810, storage 815, memory 820, a radio-frequency transceiver 840 and an infrared transceiver 845. Generally, the processor 810 retrieves and executes programming instructions stored in the memory 820. Processor 810 is included to be representative of a single CPU, multiple CPUs, a single CPU having multiple processing cores, GPUs having multiple execution paths, and the like. The memory 820 is generally included to be representative of a random access memory. The radio-frequency transceiver 840 enables the controller device 800 to transmit and receive radio-frequency signals. Likewise, the infrared transceiver 845 allows the device 800 to transmit and receive infrared signals. Further, while the depicted embodiment illustrates the components of a particular controller device 800, one of ordinary skill in the art will recognize that interactive objects may use a variety of different hardware architectures. Moreover, it is explicitly contemplated that embodiments may be implemented using any device or computer system capable of performing the functions described herein.

The memory 820 represents any memory sufficiently large to hold the necessary programs and data structures. Memory 820 could be one or a combination of memory devices, including Random Access Memory, nonvolatile or backup memory (e.g., programmable or Flash memories, read-only memories, etc.). In addition, memory 820 and storage 815 may be considered to include memory physically located elsewhere; for example, on another computer communicatively coupled to the controller device 800. Illustratively, the memory 820 includes a controller component 825, user data 830 and an operating system 835. The operating system 835 generally controls the execution of application programs on the controller device 800. Examples of operating system 835 include UNIX, a version of the Microsoft Windows® operating system, and distributions of the Linux® operating system. Additional examples of operating system 835 include custom operating systems for gaming consoles, including the custom operating systems for systems such as the Nintendo DS® and Sony PSP®.

Generally, the controller component 825 configures the interactive objects (e.g., toys 110, 115 and 120, or an action disc device 200) to perform particular actions. The particular actions can also be based on the user data 830 (e.g., historical interactions data between the user and various interactive objects, user preferences data, etc.) and one or more environmental factor (e.g., a room of the house the object is currently in, a time of day, a day of the week, etc.). For instance, in one embodiment, the controller component 825 is configured with logic for recognizing particular events and broadcasting commands for the devices to perform a corresponding action(s) in response. In such an embodiment, the controller component 825 could use input/output devices (e.g., cameras, microphones, wireless transceivers, infrared sensors, etc.) to detect when a particular event occurs. For instance, the controller component 825 could use a camera to detect when a particular projection appears, and could then broadcast a command (e.g., using a RF signal) instructing the devices to perform a corresponding action in response. As another example, the controller component 825 could receive a wireless signal (e.g., an RF signal, data communicated using Bluetooth communications, etc.) from another one of the devices, indicating that a particular action has been performed. The device could then broadcast a signal instructing one or more other devices to perform a corresponding action responsive to receiving the signal.

In a particular embodiment, the controller component 825 is configured to control the actions of multiple devices to cause the devices to perform audiovisual effects synchronously. For instance, the controller component 825 could broadcast a message to the devices, instructing the devices to perform a particular audiovisual effect immediately upon receiving the message. As another example, the controller component 825 could broadcast a message to the devices, instructing the devices to perform actions (e.g., play a sound effect, trigger a lighting effect, etc.) according to a schedule. Here, the devices may maintain internal clocks that are synchronized with one another for use in synchronously performing the audiovisual actions.

Generally speaking, the devices and the controller 800 may be implemented in any number of different ways, consistent with the present disclosure. With respect to hardware, embodiments may employ a modular design for maximum hardware reusability across different interactive objects. Such a design could include, for instance, hardware adapters that allow common processors, memories and buses to receive and send data via a multiplicity of sensors, displays, effectors and other means of communication. Additionally, system and/or operating system agnostic sites (e.g., Portals) could be used to ensure maximum compatibility for all users.

Figure 9:
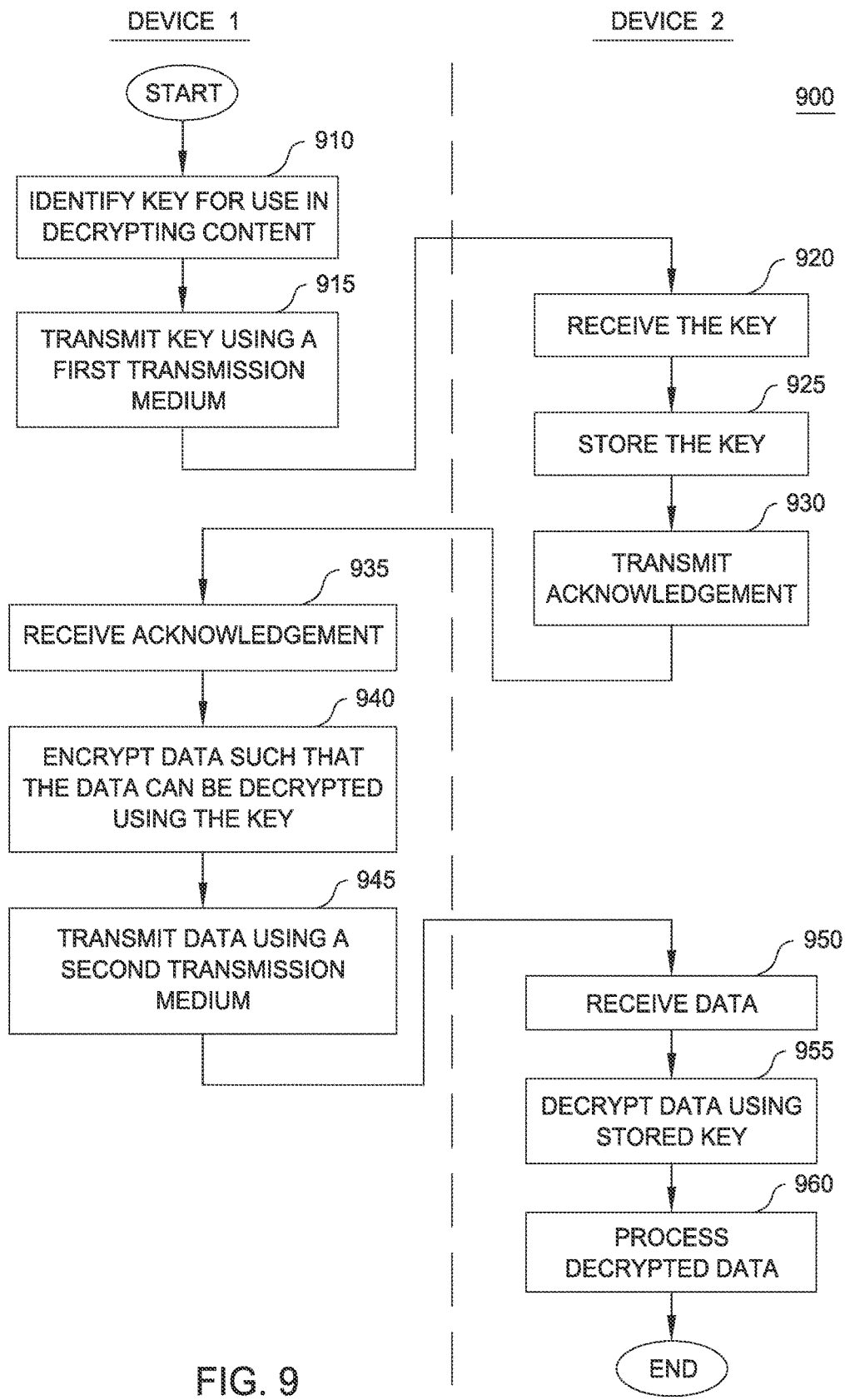
FIG. 9 is a flow diagram illustrating a method for providing a dual-transmission medium communication protocol, according to one embodiment described herein.

FIG. 9 is a flow diagram illustrating a method for providing a dual-transmission medium communication protocol, according to one embodiment described herein. As shown, the method 900 begins at block 910, where the interactive object component 725 on a first device identifies a key for use in decrypting encrypted data (e.g., a private key generated according to an asymmetric cryptography algorithm). The interactive object component 725 transmits the key to a second device using a first transmission medium (block 915).

In one embodiment, the key is transmitted using a line of sight transmissions medium, e.g., infrared signals, ultraviolet signals, visible light signals, and so on. Generally, the line of sight transmission medium refers to any transmission medium that requires a substantially unblocked line of sight between transmitters and receiving sensors used in the transmission. In a particular embodiment, the key is transmitted using the line of sight transmission medium in a general direction of the second device. For example, the interactive object component 725 on the first device could determine a direction in which the second device is located, relative to the first device, and could transmit the key to the second device in the determined direction over the line of sight communications medium using one or more line of sight transmitters. By using a line of sight transmission medium, embodiments can ensure that only devices within the same physical environment (e.g., a room of a house) can receive the transmitted data (e.g., a private key), as the line of sight transmissions generally do not pass through barriers (e.g., walls of the house). This enhances the security of the communications, as it prevents unseen devices outside of the physical environment (e.g., a device outside of the user's house such as a device in a neighboring house) from intercepting the transmitted data.

Returning to the method 900, the second device receives the transmitted key using one or more sensors configured to receive signals of the first transmission medium (block 920). The interactive object component 725 on the second device then stores the key such that the key can subsequently be retrieved for use in decrypting data (block 925) and transmits an acknowledgement message to the first device (block 930). In the method 900, the acknowledgement message is then received by the first device (block 935). Generally, the acknowledgement message can be any data communications that indicates to the first device that the key was successfully received by the second device. The acknowledgement message can be transmitted by the first transmissions medium (e.g., infrared signal communications), but more generally, can be transmitted using any suitable transmissions medium. In one embodiment, if no acknowledgement is received for a predetermined period of time, the interactive object component 725 on the first device can attempt to retransmit the key using the first transmission medium (e.g., until an acknowledgement message is received, until a predetermined number of transmissions is reached, etc.).

At some later point in time, the interactive object component 725 encrypts data such that the data can be decrypted using the previously transmitted key (block 940). For example, the interactive object component 725 could encrypt the data according to an asymmetric cryptography algorithm, using a public key corresponding to the previously transmitted private key. The interactive object component 725 then transmits the data using a second transmission medium that is distinct from the first transmission medium (block 945). Moreover, the interactive object component 725 may securely use a communications medium that does not require line of sight between the two devices, as the data cannot be decrypted even if intercepted by unauthorized devices that do not possess the private key. Examples of the second transmission medium include RF communications, Bluetooth® communications, WiFi communications, and so on. More generally, any suitable communications medium can be used.

The interactive object component 725 on the second devices receives the data using one or more sensor devices capable of receiving signals for the second transmission medium (block 950). The interactive object component 725 on the second device then decrypts the data using the previously stored key (block 955), processes the decrypted data (block 960) and the method 900 ends. For example, as discussed above, the data could specify one or more commands that the second device is to perform, as well as information designating when the second device is to execute the commands (e.g., at a particular point in time, responsive to detecting a particular event has occurred, etc.). Advantageously, the method 900 provides a secure method of data communications between the first and second devices by transmitting the key to the second device using a transmission medium (e.g., a line of sight transmission medium) that differs from the transmission medium used to transmit the encrypted data.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special-purpose hardware-based systems that perform the specified functions or acts, or combinations of special purpose hardware and computer instructions.

Additional examples of storytelling devices and story management and creation techniques, as well as proximity detection techniques and communication protocols, are provided in the attached appendices.

While the foregoing is directed to embodiments of the present invention, other and further embodiments of the invention may be devised without departing from the basic scope thereof, and the scope thereof is determined by the claims that follow.

What is claimed is:

1. A system, comprising:
   a first device; and
   a second device,
   wherein the first device comprises:
      one or more line of sight transmitters configured to transmit signals over a line of sight communications medium;
      one or more transmitters configured to transmit signals over a second communications medium that is distinct from the line of sight communications medium; and
      a controller configured to perform a first operation, comprising:
         determining a direction in which the second device is located, relative to the first device;
         transmitting a private key over the line of sight communications medium in the determined direction using the one or more line of sight transmitters, wherein the private key is generated according to a cryptography algorithm;
         generating encrypted data by encrypting data using a public key corresponding to the private key; and
         transmitting the encrypted data over the second communications medium using the one or more transmitters; and
   wherein the second device comprises:
      one or more line of sight sensors configured to receive signals over a line of sight communications medium;
      one or more sensors configured to receive signals over a second communications medium that is distinct from the line of sight communications medium; and
      a controller configured to perform a second operation, comprising:
         receiving the private key over the line of sight communications medium using the one or more line of sight sensors;
         receiving the encrypted data over the second communications medium using the one or more sensors; and
         decrypting the encrypted data using the private key received over the line of sight communications medium.

2. The system of claim 1, the second operation further comprising:
   upon receiving the private key from the second device, transmitting an acknowledgement message to the second device indicating that the private key was successfully received.

3. The system of claim 1, wherein the first device is configured to generate both the private key and the corresponding public key.

4. The system of claim 1, wherein the line of sight communications medium requires substantially unblocked line of sight between the one or more line of sight sensors of the first device and the one or more line of sight sensors of the second device.

5. The system of claim 4, wherein the line of sight communications medium comprises infrared communications, and wherein the second communications medium comprises radio frequency (RF) communications.

\* \* \* \* \*